(12) United States Patent
MacCready et al.

(10) Patent No.: US 8,011,616 B2
(45) Date of Patent: Sep. 6, 2011

(54) HYDROGEN POWERED AIRCRAFT

(75) Inventors: Paul B. MacCready, Pasadena, CA (US); Bart D. Hibbs, Alladena, CA (US); Robert F. Curtin, Simi Valley, CA (US)

(73) Assignee: AeroVironment Inc., Monrovia, CA (US)

( * ) Notice: Subject to any disclaimer, the term of this patent is extended or adjusted under 35 U.S.C. 154(b) by 1 day.

(21) Appl. No.: 11/973,092

(22) Filed: Oct. 5, 2007

(65) Prior Publication Data

US 2008/0203219 A1    Aug. 28, 2008

Related U.S. Application Data

(60) Division of application No. 10/600,258, filed on Jun. 20, 2003, now Pat. No. 7,281,681, which is a continuation-in-part of application No. 10/073,828, filed on Feb. 11, 2002, now abandoned, which is a division of application No. 09/826,424, filed on Apr. 3, 2001, now Pat. No. 6,550,717.

(60) Provisional application No. 60/194,137, filed on Apr. 3, 2000, provisional application No. 60/241,713, filed on Oct. 18, 2000.

(51) Int. Cl.
*B64D 27/24* (2006.01)
*B64D 27/00* (2006.01)

(52) U.S. Cl. ............................ 244/59; 244/53 R; 244/58

(58) Field of Classification Search .................... 244/59, 244/53 R, 62, 58
See application file for complete search history.

(56) References Cited

U.S. PATENT DOCUMENTS 3,110,631 A    11/1963    Carlton
(Continued)

FOREIGN PATENT DOCUMENTS

DE    582542    1/1934
(Continued)

OTHER PUBLICATIONS

Atmospheric Pressure—Wikipedia article, retrieved online on Nov. 6, 2009 from http://en.wikipedia.org/wiki/Atmospheric_pressure.*

(Continued)

*Primary Examiner* — Tien Dinh
*Assistant Examiner* — Richard R Green
(74) *Attorney, Agent, or Firm* — Eric J. Aagaard, Esq.; The Law Office of John A. Griecci

(57) ABSTRACT

Disclosed is an aircraft, configured to have a wide range of flight speeds, consuming low levels of power for an extended period of time, while supporting a communications platform with an unobstructed downward-looking view. The aircraft includes an extendable slat at the leading edge of the wing, and a reflexed trailing edge. The aircraft comprises a flying wing extending laterally between two ends and a center point. The wing is swept and has a relatively constant chord. The aircraft also includes a power module configured to provide power via a fuel cell. The fuel cell stores liquid hydrogen as fuel, but uses gaseous hydrogen in the fuel cell. A fuel tank heater is used to control the boil-rate of the fuel in the fuel tank. The fuel cell compresses ambient air for an oxidizer, and operates with the fuel and oxidizer at pressures below one atmosphere. The aircraft of the invention includes a support structure including a plurality of supports, where the supports form a tetrahedron that affixes to the wing.

6 Claims, 8 Drawing Sheets

U.S. PATENT DOCUMENTS

| | | | |
|---|---|---|---|
| 3,346,718 | A | 10/1967 | Cooley et al. |
| 3,365,897 | A | 1/1968 | Middleton et al. |
| 3,404,061 | A | 10/1968 | Shane et al. |
| 3,438,597 | A | 4/1969 | Kasper |
| 3,607,419 | A | 9/1971 | Keating, Jr. |
| 3,941,272 | A | 3/1976 | McLaughlin |
| 4,023,617 | A | 5/1977 | Carlson et al. |
| 4,403,755 | A | 9/1983 | Gutsche |
| 4,415,133 | A | 11/1983 | Phillips |
| 4,520,763 | A | 6/1985 | Lynch et al. |
| 4,568,442 | A | 2/1986 | Goldsmith |
| 4,697,761 | A * | 10/1987 | Long .............................. 244/62 |
| 4,722,773 | A | 2/1988 | Plowman et al. |
| 4,742,977 | A | 5/1988 | Crowell |
| 4,768,738 | A | 9/1988 | Weinert |
| 4,863,813 | A | 9/1989 | Dyer |
| 4,907,764 | A | 3/1990 | Long |
| 5,047,298 | A | 9/1991 | Perry et al. |
| 5,106,035 | A * | 4/1992 | Langford, III .................. 244/59 |
| 5,178,968 | A | 1/1993 | Roche |
| 5,216,888 | A | 6/1993 | Kupiszewski et al. |
| 5,340,663 | A | 8/1994 | Buswell et al. |
| 5,374,010 | A | 12/1994 | Stone et al. |
| 5,449,697 | A | 9/1995 | Noaki et al. |
| 5,547,777 | A | 8/1996 | Richards |
| 5,678,783 | A | 10/1997 | Wong |
| 5,709,961 | A * | 1/1998 | Cisar et al. ....................... 429/32 |
| 5,780,981 | A * | 7/1998 | Sonntag et al. ............... 429/432 |
| 5,810,284 | A * | 9/1998 | Hibbs et al. ..................... 244/62 |
| 5,839,699 | A | 11/1998 | Bliesner |
| 6,068,942 | A | 5/2000 | Strasser et al. |
| 6,178,754 | B1 | 1/2001 | Dujarric |
| 6,296,957 | B1 | 10/2001 | Graage |
| 6,347,719 | B1 | 2/2002 | Rosen et al. |
| 6,364,251 | B1 | 4/2002 | Yim |
| 6,450,447 | B1 | 9/2002 | Konrad et al. |
| 6,568,633 | B2 | 5/2003 | Dunn |
| 6,613,466 | B1 | 9/2003 | Schuessler |
| 6,931,247 | B2 | 8/2005 | Cox et al. |
| 2004/0069897 | A1 | 4/2004 | Corcoran |

FOREIGN PATENT DOCUMENTS

| | | |
|---|---|---|
| DE | 648122 | 7/1937 |
| DE | 28 03 041 | 8/1979 |
| EP | 0967676 A1 | 12/1999 |
| GB | 375515 | 6/1932 |
| WO | WO 99/34467 | 7/1999 |
| WO | WO 99/65097 A1 | 12/1999 |

OTHER PUBLICATIONS

Gelfi, Sylvain; Stefanopoulou, Anna G.; Pukrushpan, Jay T.; and Peng, Huei; "Dynamics of Low-Pressure and High-Pressure Fuel Cell Air Supply Systems," Proceedings of the American Control Conference, Jun. 4-6, 2003, pp. 2049-2054, Denver, Colorado, USA.

Williams, Arthur L., "A New and Less Complex Alternative to the Handley Page Slat," 452 Journal of Aircraft, Mar. 1986, pp. 200-206, vol. 23, New York, USA.

Brown, Stewart F., "Eternal Airplane—A Solar Electric Wing Takes Off," Popular Science, Apr. 1994, pp. 70-75 and 100.

Walter, Katie, "The Unitized Regenerative Fuel Cell," Science & Technology Review, May 1997, www.Ilnl.gov/str/05.97.html, pp. 1-5.

Mitlitsky, Fred, "Advanced Power Systems for Exoskeletons," Presented at Exoskeletons for Human Performance Augmentation (EHPA) Workshop, Dulles, VA, Mar. 1-3, 2000, pp. 1-21.

"What Are Fuel Cells", www.e-sources.com/fuelcell/fcexpln, pp. 1-5.

Nice, Karim; "How Fuel Cells Work", www.howstuffworks.com/fuel-cell.htm/printable, pp. 1-7.

Answers.com, "Fuel Cell" www.answers.com/fuel+cell&r=67, pp. 1-9.

International Search Authority "International Search Report and Written Opinion of the International Searching Authority" for related application PCT/US04/19746 (a PCT application corresponding to parent of current application), Dec. 23, 2005.

* cited by examiner

HYDROGEN POWERED AIRCRAFT

The present application is a divisional of application Ser. No. 10/600,258, filed Jun. 20, 2003 now U.S. Pat. No. 7,281,681, which is a continuation-in-part of application Ser. No. 10/073,828, filed Feb. 11, 2002 now abandoned, which is a divisional of application Ser. No. 09/826,424, filed Apr. 3, 2001 now U.S. Pat. No. 6,550,717, which claims priority from two U.S. provisional patent applications, Ser. No. 60/194,137, filed Apr. 3, 2000, and Ser. No. 60/241,713, filed Oct. 18, 2000, all of which are incorporated herein by reference for all purposes.

BACKGROUND OF THE INVENTION

This invention relates generally to aircraft and their component systems, and, more particularly, to improved high-performance aircraft systems capable of high-altitude stationkeeping within tight altitude and perimeter boundaries for extended periods of time.

A worldwide expansion in the demand for communication bandwidth is driving up the bandwidth requirements between satellites and ground-stations. One way to increase this satellite-to-ground bandwidth is to interpose one or more high-altitude platforms (HAPs) configured for relaying signals between the two. A HAP allows for lower power transmissions, narrower beamwidths, as well as a variety of other advantages that provide for greater bandwidth. However, due to a demanding set of design requirements, years of design efforts at creating highly effective HAPs are only now beginning to come to fruition.

In particular, it is desirable to have a stratospheric aircraft, capable of carrying a significant communications payload (e.g., a payload of more than 100 kg that consumes more than 1 kw of electric power), that can remain aloft for days, weeks or even months at a time. This flight capability will preferably be maintainable even in zero or minimum sunlight conditions where solar power sources have little functionality. Also, the aircraft is preferably remotely pilotable to limit its weight and maximize its flight duration.

The communications payload preferably is configured to view downward over a wide, preferably unobstructed field of view. The aircraft will preferably be capable of relatively high-speed flight that is adequate to travel between its station and remote sites for takeoff and/or landing to take advantage of benign weather conditions. At the same time, the aircraft preferably is capable of maintaining a tight, high-altitude station in both high-wind and calm conditions, thus requiring relatively high-speed and relatively low-speed flight, and a small turning radius while maintaining the payload's downward-looking (and preferably upward-looking for some embodiments) view. To meet these stringent design specifications, the performance of the aircraft's power system, flight control system and airframe configuration and are all preferably improved over prior practice.

Power Systems

Conventional aircraft are typically powered using aviation fuel, which is a petroleum-based fossil fuel. The prior art mentions the potential use of liquid hydrogen as a fuel for manned airliners and supersonic stratospheric flight. There is also 25-year-old prior art mentioning the possibility of using liquid hydrogen as fuel for a stratospheric blimp.

U.S. Pat. No. 5,810,284 (the '284 patent), which is incorporated herein by reference for all purposes, discloses an unmanned, solar-powered aircraft that significantly advanced the art in long-duration, stratospheric aircraft. It flies under solar power during the day, and stores up additional solar power in a regenerative fuel cell battery for use during the night to maintain its station. The fuel cell battery is a closed system containing the gaseous elements of hydrogen and oxygen that are dissociated from, and combined into, water.

The aircraft disclosed in the '284 patent is an unswept, span-loaded, flying wing having low weight and an extremely high aspect ratio. Multiple electric engines are spread along the wing, which is sectionalized to minimize torsion loads carried between the sections. Most or all of the sections contain a hollow spar that is used to contain the elements used by the fuel cell. Large fins extend downward from inner ends of the sections. The wings contain two-sided solar panels within transparent upper and lower surfaces to take maximum advantage of both direct and reflected light.

The above-described technologies cannot provide for long-duration, high-altitude flights with tight stationkeeping when the available solar power is highly limited.

Flight-Control Components

Various components are known for use in controlling flight. Each component has unique advantageous and disadvantageous characteristics.

Many present-day small aircraft and some sailplanes use simple flaps to increase camber and obtain higher lift coefficients, and hence, adequate lift at lower speeds. Such flaps are typically retracted or faired to reduce drag during high-speed flight, and also during turbulence to reduce the maximum G loads that the wing will then experience. An important characteristic of the use of flaps, or of the use of highly cambered airfoils designed for high lift, is that the extended flap or highly cambered airfoil provides the wing with a large negative pitching moment. This affects both overall vehicle stability and the wing's torsional twisting. Indeed, for high aspect-ratio wings, the twist at the wing's outer portions due to a negative pitching moment can pose severe structural and flight control problems.

Airliners use both leading edge slats and sophisticated flaps, such as slotted or Fowler flaps, to widen their speed range. Small planes employ slats that open automatically when needed. Hang gliders have employed flexible airfoil tightening to decrease camber for high-speed flight. Some work has been done with flexible flap material that unrolls and pulls back from the rear of the wing. Some aircraft feature wings characterized by a sweep that can be varied in flight, even turning the entire wing so that it is not perpendicular to the flight direction during high-speed flight.

For maintaining low-speed flight without stalling, large solid or porous surfaces that hingedly swing up from a wing top in low-speed flight to potentially stabilize vortices immediately behind them, are known. This might provide an increased lift coefficient before stall is reached. Various vortex generators and fences are used to delay the onset of a stall or to isolate the portion of a wing that is stalled. Furthermore, various stall warning/actuators allow aircraft to operate relatively close to their stall speed. Additionally, some combinations of airfoils and wing configurations feature gentle stalls and so the vehicle can be operated at the stall edge without abrupt drag increases or lift decreases during the onset of a stall. Experimental aircraft have even employed rotary devices to permit low-speed flight, with mechanisms that restrict rotary moment and decrease drag or potentially augment lift when at higher speeds the wing provides the main lift. Many of the above mechanisms provide this increased low-speed control at the expense of weight and reliability.

In some high-tech aircraft, highly-active control is used to maintain stable operation over a wide range of speeds and orientations. This emulates the flying characteristics of natural fliers that change wing and airfoil geometry. In aircraft, such systems are complex, potentially heavy, and expensive, as well as fault-intolerant.

Airframe Configuration

The requirements for wide speed range, low power, light weight, unimpeded communications platform view, simplicity, and reliability present significant tradeoff challenges. A highly cambered airfoil helps with lowering minimum flight speed, but is accompanied by a large negative pitching moment that impacts the aeroelastic effects of wing twist.

Furthermore, there is an inherent relationship between an aircraft's overall airframe geometry and the design of its airfoils and control surfaces. Typical aircraft offset negative (i.e., nose-down) pitching moments through the use of tail moments (i.e., vertical forces generated on the empennage with a moment arm being the distance from the wing to the empennage) or through the use of a canard in front of the wing that, for pitch stability, operates at a higher lift coefficient than the wing and stalls earlier. Tails mounted in the up-flow of wingtip vortices can be much smaller than tails positioned in the wing downwash, but there are structural difficulties in positioning a tail in the up-flow.

Commercial airliners address the high coefficient of lift ($C_L$) requirements for landing and takeoff with a complex array of slats and flaps that are retracted during high-speed flight to lower drag and gust-load severity. A rigid wing structure, and pitch controllability from the tail's area and moment arm, permit this approach. However, this approach is contrary to the requirement that the present aircraft carry fuel adequate to last for extended periods of time, and still be economical.

The very special requirements and technological challenges for the aircraft of the present invention have not been met by existing aircraft designs. Accordingly, there has existed a definite need for a lightweight aircraft capable of both stationkeeping and flight over a wide range of speeds, that consumes low levels of power for an extended period of time, that supports a communications platform with a wide, unobstructed view, and that is characterized by simplicity and reliability. Embodiments of such an invention can serve as high altitude platforms. Embodiments of the present invention satisfy various combinations of these and other needs, and provide further related advantages.

SUMMARY OF THE INVENTION

The present invention provides aircraft, aircraft components and aircraft subsystems, as well as related methods. Various embodiments of the invention can provide flight over a wide range of speeds, consuming low levels of power for an extended period of time, and thereby supporting a communications platform with an unobstructed downward-looking view, while and having simplicity and reliability.

In one variation, a wing of the invention is characterized by having adequate camber to achieve a lift coefficient of approximately 1.5 at the Reynolds number experienced by sailplanes or flexible-winged stratospheric aircraft. The wing defines a leading edge and a trailing edge, and the trailing edge includes either a reflexed portion or a trailing edge flap that can extend upward. Either the reflexed portion or the flap is configured to provide the wing with a pitching moment greater than or equal to zero in spite of the camber. This feature advantageously allows for low-speed flight with a flexible wing in many embodiments.

This feature is augmented by an extendable slat at the leading edge of the wing. These features, in combination, provide for an excellent coefficient of lift of the wing, typically increasing it by more than 0.3, and preferably by 0.4 or more, at airspeeds just above the stall speed. Using its retractability, the slat can become part of the wing's airfoil that is otherwise defined by the wing's camber. Slats are convenient because they have a negligible or beneficial effect on a wing's pitching moment. While flaps might help increase the $C_L$ more than slats, they do so at the cost of a big increase in negative pitching moment that potentially requires heavy, drag-producing countermeasures for compensation.

In another variation of the invention, an aircraft comprises a flying wing extending laterally between two ends and a center point, substantially without a fuselage or an empennage. The wing is swept and has a relatively constant chord. The aircraft also includes a power module configured to provide power for the aircraft, and a support structure including a plurality of supports, where the supports form a tetrahedron. This tetrahedron has corners in supportive contact with the wing at structurally stiff or reenforced points laterally intermediate the center point and each end. The tetrahedron also has a corner in supportive contact with the wing's center point, which is also structurally stiff or reenforced. Advantageously, the flying wing is configured with a highly cambered airfoil and with reflex at a trailing edge. The wing is also configured with slats. These features provide many embodiments with the capability of high-altitude flight with a wide range of speeds.

A third variation of the invention is an aircraft, and its related power system, for generating power from a reactant such as hydrogen. The power system includes a fuel cell configured to generate power using a gaseous form of the reactant, the fuel cell being configured to operate at a power-generation rate requiring the gaseous reactant to be supplied at an operating-rate of flux. The power system also includes a tank configured for containing a liquid form of the reactant, wherein the tank includes a heat source for increasing a boiling-rate of the reactant. The tank is configured to supply its reactant to the fuel cell at a rate determined by the boiling-rate of the reactant, and the heat source is configured to increase the boiling rate of the reactant to a level adequate for supplying the resulting gaseous reactant to the fuel cell at the operating-rate of flux. An advantage of such an aircraft is that it provides for a minimized system weight, volume and complexity, while not excessively sacrificing power generation.

In a fourth variation of the invention, the power system of the third variation includes a tank that comprises an inner aluminum tank liner having an outer carbon layer, an outer aluminum tank liner having an outer carbon layer, and connectors extending between the inner and outer aluminum tank liners to maintain the aluminum tank liners' relative positions with respect to each other. The volume between the inner and outer tank liners is evacuated to minimize heat transfer between the contents of the tank and the outside environment. The connectors between the inner and outer layers are configured with holes in their walls to minimize direct heat-conduction between the contents of the tank and the outside environment.

In a fifth variation of the invention, an aircraft includes a hydrogen source, an oxygen source and a fuel cell configured to combine hydrogen from the hydrogen source and oxygen from the oxygen source to generate power. The fuel cell is preferably configured to combine the hydrogen and the oxygen at less than one atmosphere of pressure, and more preferably at roughly 2-3 psia. This advantageously allows stratospheric flight with simpler fuel cell technology.

Preferred embodiments of the above aspects of the invention, and various combinations of their features, provide for unmanned aircraft capable of flying in the stratosphere, in a stationkeeping mode, carrying a payload of more than 100 kg that consumes more than 1 kw of electric power, and remaining aloft for a significant period of time while being able to operate from a remote site where takeoff/landing weather is benign.

Other features and advantages of the invention will become apparent from the following detailed description of the preferred embodiments, taken in conjunction with the accompanying drawings, which illustrate, by way of example, the principles of the invention.

DETAILED DESCRIPTION OF THE PREFERRED EMBODIMENTS

First Preferred Aircraft Embodiment

Figure 1A:
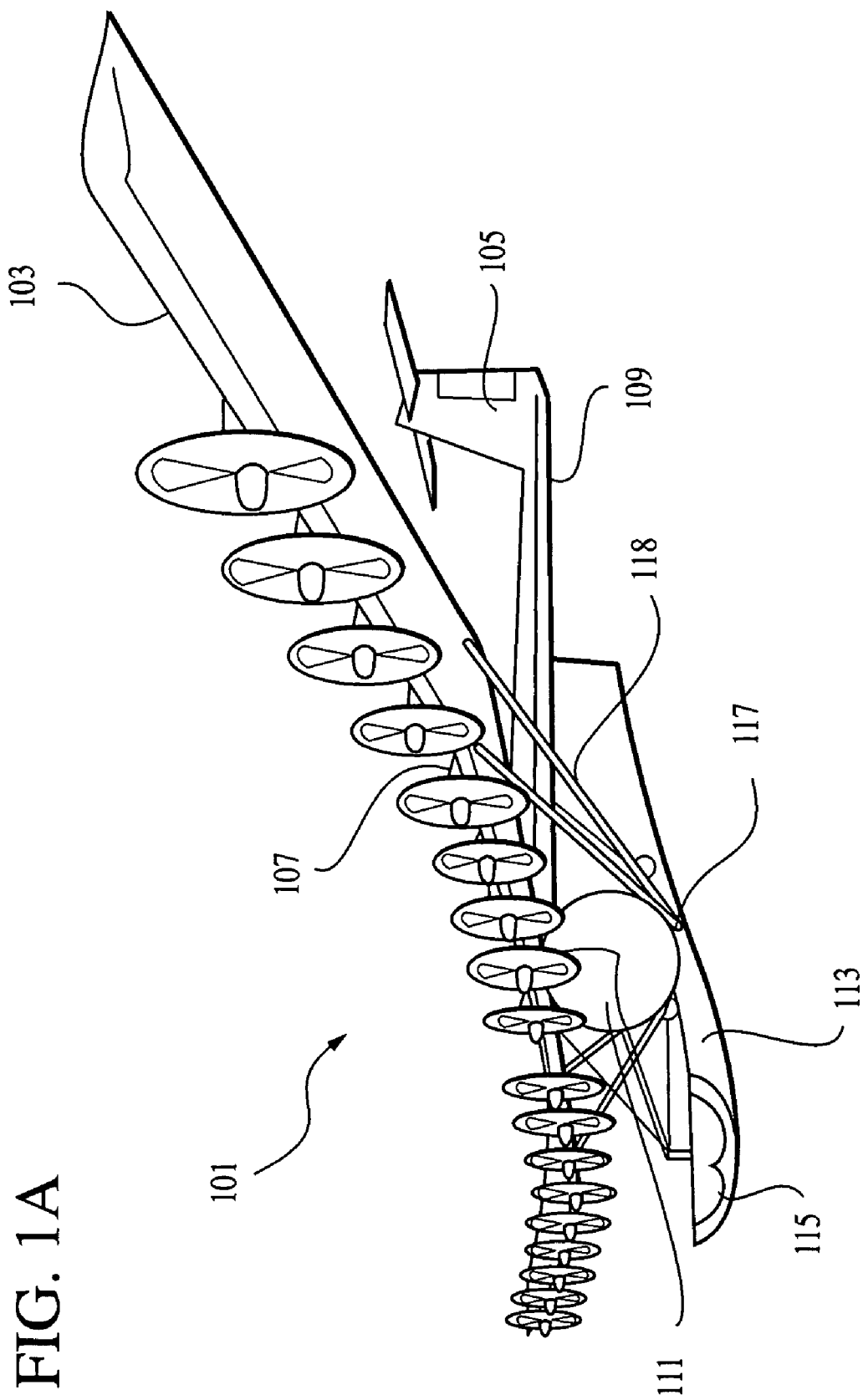
FIG. 1A is a perspective view of a first embodiment of an aircraft embodying features of the present invention, the aircraft having a cowling removed to expose a fuel tank that the cowling conceals.
Figure 1B:
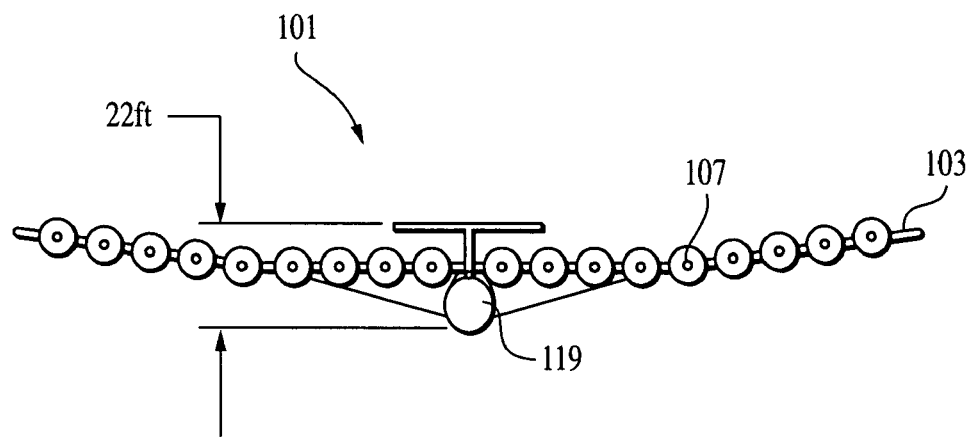
FIG. 1B is a front elevational view of the embodiment depicted in FIG. 1A, having its cowling in place.
Figure 1C:
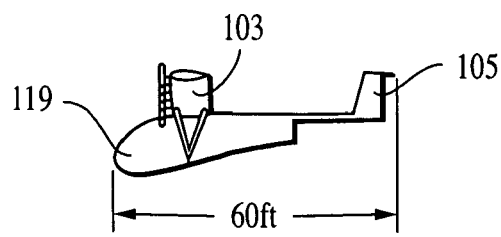
FIG. 1C is a right side elevational view of the embodiment depicted in FIG. 1B.
Figure 1D:
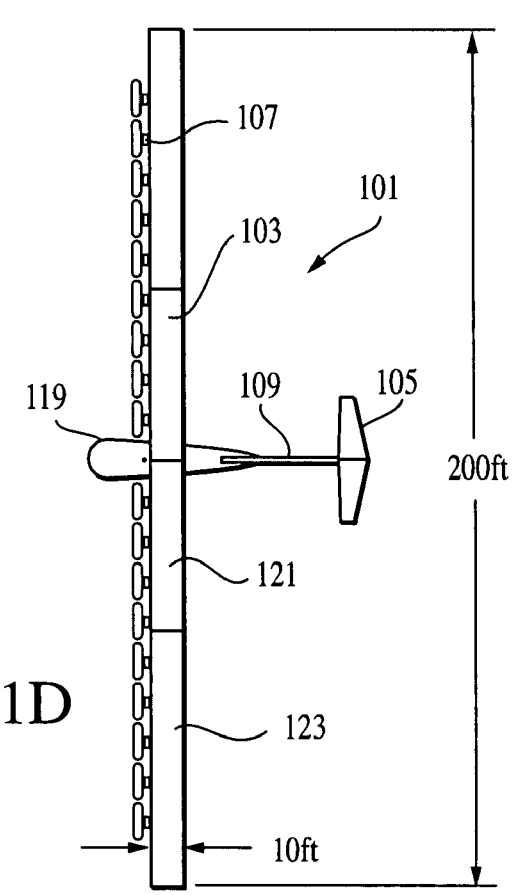
FIG. 1D is a top plan view of the embodiment depicted in FIG. 1B, rotated by 90 degrees.

A first preferred, high-performance aircraft embodiment 101, capable of high-altitude stationkeeping within tight altitude and perimeter boundaries for extended periods of time, according to the present invention, is shown in FIGS. 1-4. The aircraft includes a wing 103, an empennage 105 and a plurality of motors 107. The empennage is preferably suspended from the wing on an extension 109 to provide the moment arm necessary to control pitch and yaw. Thus, the extension's length will be based on the empennage's surface area and the needed pitching and yawing moments.

A fuel tank 111 is suspended below the wing using trusses and/or wires. A payload section 113 containing a communications payload 115 extends forward from a lower portion 117 of the fuel tank, and is suspended using trusses, wires and/or supports 118. Preferably, the aircraft includes a cowling or fuselage portion 119 (not shown in FIG. 1 to expose contents) that forms a single aerodynamic body enclosing the fuel tank and payload section.

Preferably, the wing 103 is unswept, extending 200 feet tip-to-tip. The wing preferably has a constant 10 foot chord, and thus an aspect ratio of 20. The wing thus has an aspect ratio on the order of 20. Port and starboard sides of the wing are each equipped with an inboard portion 121 having no dihedral and an outboard portion 123 having a positive dihedral. The wing is torsionally flexible to limit the overall aircraft weight.

First Preferred Aircraft Embodiment

Fuel and Power Systems

Figure 2:
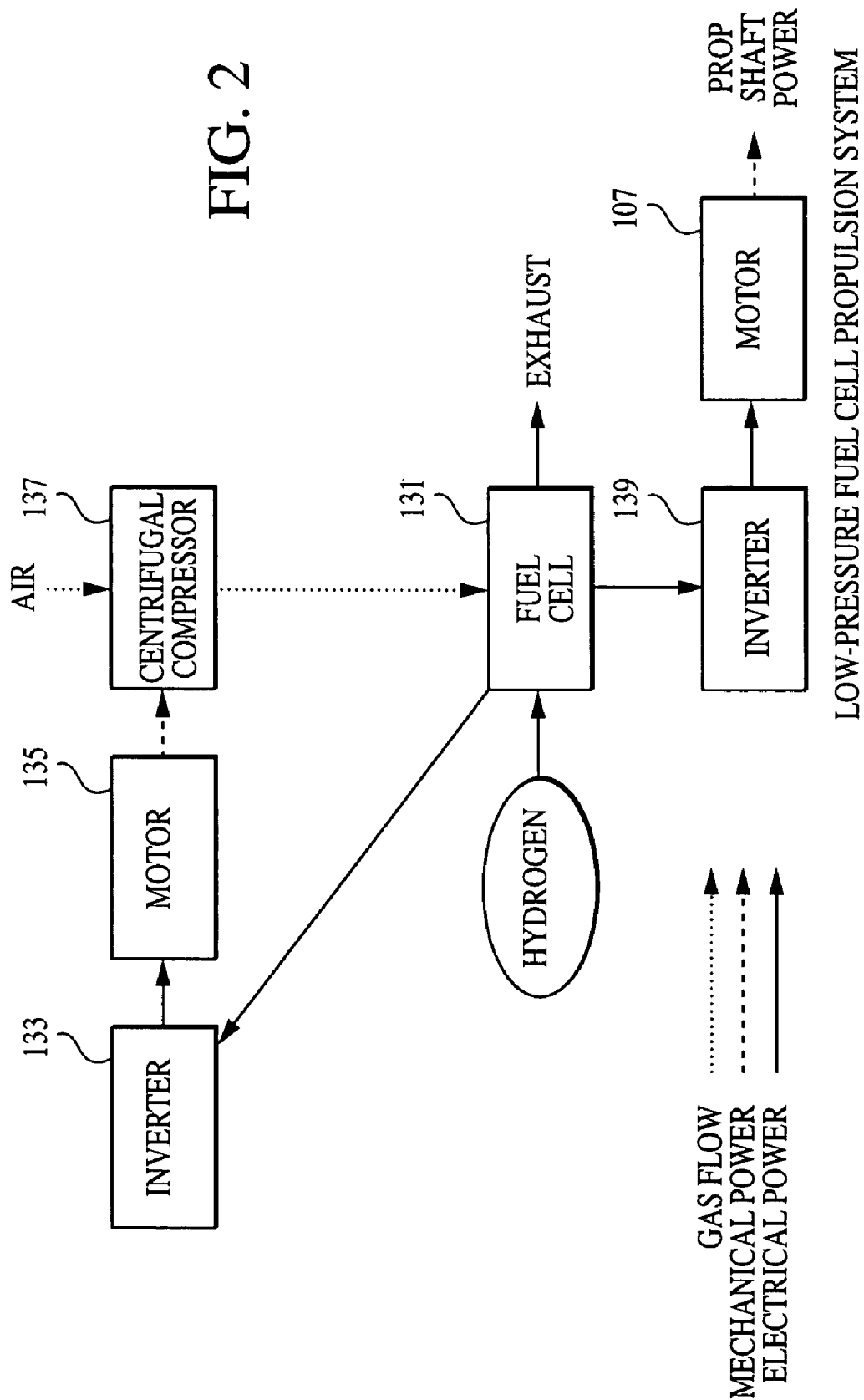
FIG. 2 is a system diagram of a fuel cell system for the embodiment depicted in FIG. 1A.

Each side of an inboard portion 121 of the wing mounts four electric motors 107, and each side of an outboard portion 123 of the wing mounts five electric motors, for a total of 18 electric motors. With reference to FIG. 2, preferably the aircraft is powered by a hydrogen-air fuel cell system that uses gaseous hydrogen as fuel. The system includes a fuel cell 131 that combines a reactant of gaseous hydrogen with oxygen and outputs electric power and water. The fuel cell powers an inverter 133 that runs a motor 135 that drives a compressor 137 to compress outside air to provide oxygen for the fuel cell. The air and hydrogen combine in the fuel cell to create the power both for the compressor's inverter, and for an inverter 139 to run a propeller motor.

The fuel cell of the preferred embodiment can be configured to operate with a fuel of gaseous hydrogen at reaction pressures (i.e., the pressure of the hydrogen gas when it reacts with the oxygen via a membrane electrode assembly) above 1 atmosphere, such as approximately 15 psi or higher. However, unlike typical hydrogen-powered systems, which are designed with complex thermal and mechanical systems to operate at reaction pressures of greater than one atmosphere, the present embodiment is preferably designed to operate at reaction pressures ranging below 1 atmosphere, and possibly down to even 2 or 3 psia, when the aircraft is at cruise altitudes. This feature can significantly reduce the cost and weight of the power generation system while increasing its reliability during high-altitude flight.

The hydrogen reacted by the fuel cell is preferably derived from a fuel source comprising liquid hydrogen that is stored in the fuel tank 111. Storing the fuel as a liquid provides for the fuel to be stored in a volume that is small enough to fit reasonable aircraft shapes. Preferably, the cryogenic container(s) necessary to carry the fuel are relatively lightweight. Other known hydrogen sources such as gaseous hydrogen tanks are within the scope of the invention.

As noted above, the fuel cell reacts air as an oxidizer, the air being compressed from ambient air. Preferably the air is taken into the aircraft at any given cruise flight condition so that storage and retrieval are not necessary. This allows for continuous operation (i.e., operation for an unlimited period of time within the fuel capacity of the aircraft) of the aircraft at stratospheric flight conditions.

The oxidizer source for the aircraft preferably comprises an inlet for ambient air and preferably a compression mechanism configured to compress the ambient air. The compression mechanism is preferably a compressor as described above, but may also be other compression mechanisms such as aerodynamic devices that operate using the ram pressure generated by the aircraft's airspeed. Other known oxygen sources such as oxygen tanks are also within the scope of the invention.

Figure 3:
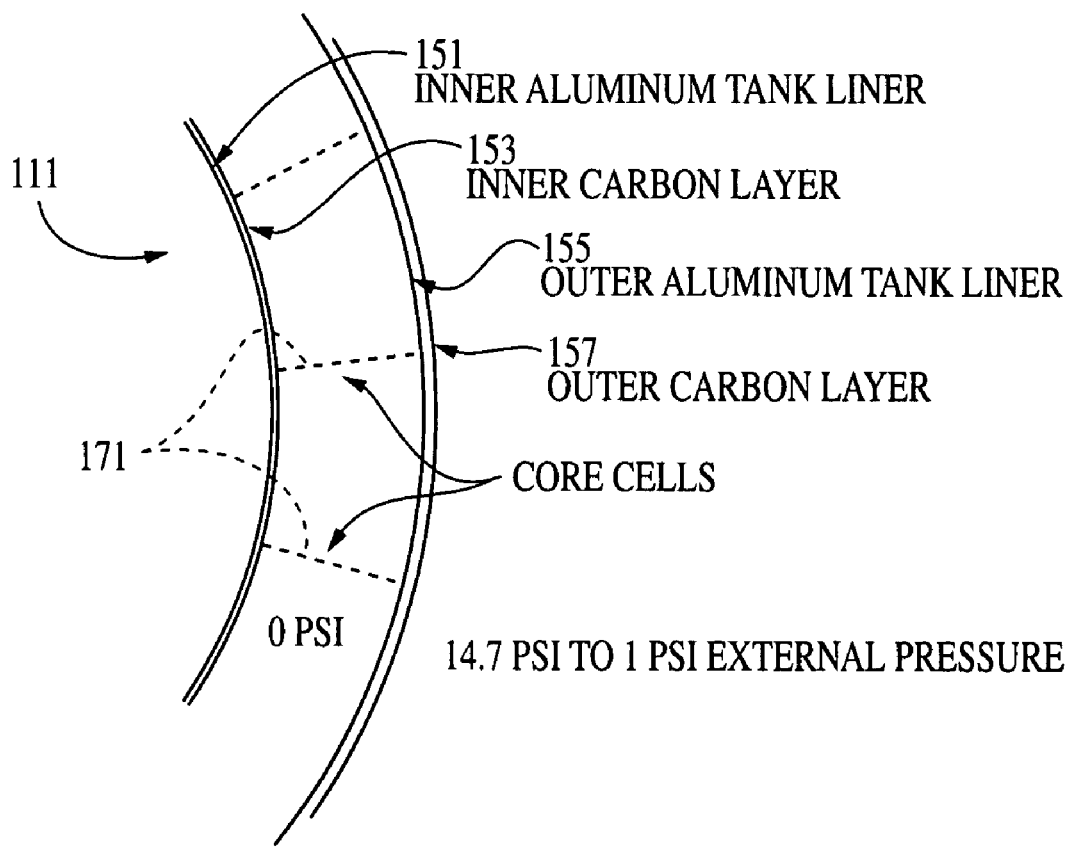
FIG. 3 is a partial cross-sectional view of the fuel tank's wall in the embodiment depicted in FIG. 1A.
Figure 4:
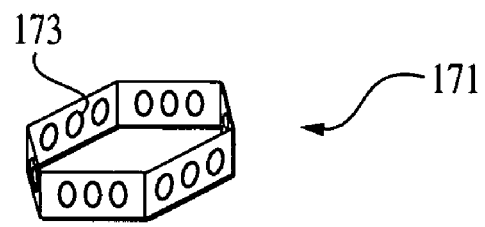
FIG. 4 is a partial cross-sectional view of a cross cell connector used in the fuel tank's wall depicted in FIG. 3.

With reference to FIGS. 1A, 3 and 4, the fuel tank preferably includes an inner aluminum tank liner 151, having an inner carbon layer 153 formed on it, and an outer aluminum tank liner 155, with an outer carbon layer 157 formed on it. The internal radius of the inner aluminum layer is preferably four feet. Such a tank will preferably hold approximately 1,180 pounds of liquid hydrogen.

Core cells 171 are bonded onto and extend between the inner and outer aluminum tank liners 151 and 155 to connect them. These cells are preferably hexagonal, having vent holes 173 in the walls of the cells. A vacuum is created between the inner and outer aluminum tank liners, minimizing heat transfer between the fuel and the outside environment. The vent holes minimize the direct heat-conduction path. Preferably, each cell extends four inches between opposing sides. The fuel tank preferably insulates the liquid hydrogen fuel so as to receive 28 or fewer watts through convection from the surrounding, ambient air.

The fuel cell is configured to operate at one or more power-generation rates that require the gaseous hydrogen to be supplied at related operating-rates of flux. The heat received by the liquid hydrogen via convection through the insulated tank walls preferably causes the liquid hydrogen to boil at a boiling-rate lower than one or more (and preferably all) of the anticipated boiling-rates desired to produce gaseous hydrogen at the related operating-rates of flux. However, if a hybrid power system (e.g., a combination fuel cell and solar cell system) is used, there might be times when a zero boiling rate would be preferred.

To provide hydrogen to the fuel cell at an acceptable rate over the convection boiling rate, heat is either delivered to, or generated in, the fuel tank 111 by a heat source. That heat source is configured to increase the boiling-rate of the liquid hydrogen to one or more desired boiling-rates adequate to supply gaseous hydrogen to the fuel cell at an operating-rate of flux. The fuel tank is configured to supply hydrogen to the fuel cell at a rate related to and/or determined by the boiling-rate of the hydrogen, and thus operate the fuel cell at a power-generation rate adequate to power generation needs.

Preferably the heat source is an electrical heating element. The fuel in the fuel tank is preferably boiled off over ten or more days to maintain the aircraft's flight for at least that length of time. Preferably 1.5 kilowatts of heater power are required to boil the liquid hydrogen off over that period of time. The heater is preferably configured such that increased levels of heater power are readily available when needed.

The aircraft is preferably includes a controller configured to regulate the reaction pressure of either of (or both of) the fuel and the oxidizer. The controller regulates these reaction pressures in response to the power requirements of the aircraft, increasing the given power-generation rate by appropriately increasing the reaction pressures of one or both of the reactants. The controller preferably regulates the reaction pressure of the oxidizer by regulating the amount that the compressor compresses the ambient air being fed to the fuel cell. Similarly, the controller preferably regulates the reaction pressure of the fuel being fed to the fuel cell by regulating the heat generated by the heat source, and thus the boiling rate of the liquid fuel.

Under the regulation of the controller, at near sea-level conditions (e.g., conditions during take-off at normal ground-level airports), the compressor might operate to compress the ambient air to reaction pressures above 1 atmosphere. However, compression will only occur if it is needed for adequate power generation. As the aircraft ascends to higher altitudes, such as cruise-level altitudes, the ambient air is lower in pressure. Rather than increasing compression levels to completely compensate for the lower ambient pressures, the controller regulates the compression of ambient air to produce reaction pressures below 1 atmosphere.

Under the regulation of the controller, at near sea-level conditions such as take-off conditions, the heat source will generally operate to produce hydrogen gas at a reaction pressure that might exceed 1 atmosphere. However, to maintain the fuel supply, hydrogen will only be provided at a rate needed to generate the power required by the aircraft from the fuel cell.

During the flight of the aircraft, the controller preferably regulates the reaction pressures of the oxygen and the hydrogen such that hydrogen is reacted at the minimum rate necessary for the fuel cell to meet its power-generation rate requirements. This minimizes both fuel use and the power drain from boiling the liquid hydrogen. The controller also preferably regulates compressor operation to minimize power usage, which typically means that the air is compressed as little as possible. However, to protect the integrity of the fuel cell membrane, the reaction pressure of the fuel is maintained at no greater than a predetermined increment away from (and generally above) the reaction pressure of the oxidizer.

Preferably, at stratospheric conditions (e.g., 55,000-70,000 ft), where ambient air will typically be at less than 2 psia, the controller will typically regulate the compressor to produce an air reaction pressure of approximately 6 psia (i.e., 6 psia, within a range established by significant digits). Preferably the increment of the fuel reaction pressure from the oxidizer reaction pressure will be no more than approximately 4 or 5 psi. Thus, at stratospheric conditions the controller will typically regulate the fuel source to produce a fuel reaction pressure of no more than approximately 10 or 11 psia.

Based on the recited fuel and propulsion system, it is estimated that the aircraft, with a gross weight of 4,000 pounds, can loiter at 60,000 feet MSL within an area of 3,600 feet, with a speed of 130 feet per second, and a potential dash speed of 180 feet per second when necessary. To maintain a presence within the loiter diameter, the aircraft will bank up to 15 degrees in turning maneuvers.

First Preferred Aircraft Embodiment

Airfoil Camber

Figure 5:
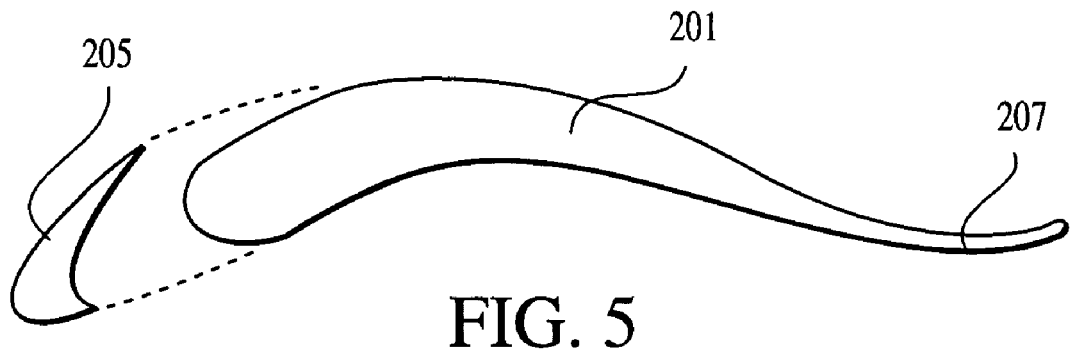
FIG. 5 is a cross-sectional view of a wing on the embodiment depicted in FIG. 1A.

With reference to FIG. 5, the wing of the preferred embodiment preferably includes a highly cambered airfoil 201 that provides for high lift in low-speed flight regimes. The airfoil's camber permits the airfoil to achieve a lift coefficient of about 1.5 at the Reynolds number typically experienced by sailplanes and the stratospheric aircraft of the invention.

An important aspect of the use of highly cambered airfoils is that they cause large negative pitching moments on the wing. In an alternate variation, this embodiment uses flaps 203 to produce a highly cambered airfoil in low-speed flight regimes (see, FIG. 6).

First Preferred Aircraft Embodiment

Variation One—Stiff Wing

In a first variation of the first preferred embodiment, the empennage provides moments to react the overall moment of the airfoil's negative pitching moment. The supports 118 and the wing structure in the area outboard of the wing's connection to the slats provide structural support and rigidity to the wing so as to avoid excessive wing torsion First Preferred Aircraft Embodiment Variation Two—Counteracting Moments In a second variation of the first preferred embodiment, the wing includes slats and/or a reflexed trailing edge, providing positive pitching moments to react the overall effect of the airfoil's negative pitching moment.

Figure 6:
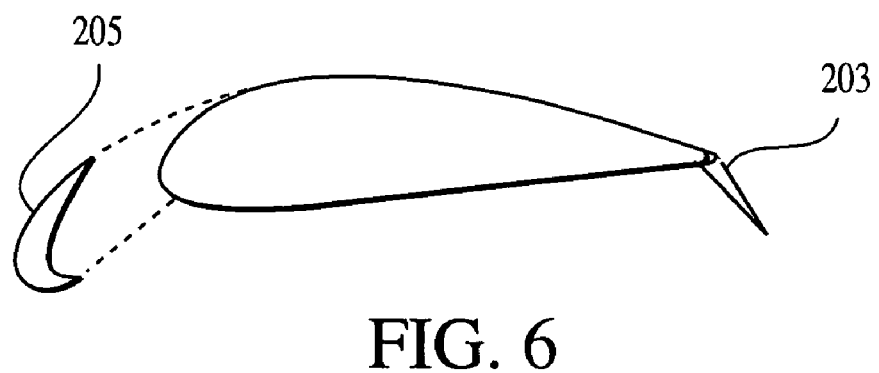
FIG. 6 is a cross-sectional view of a wing on a variation of the embodiment depicted in FIG. 1A.

In this variation, the wing of the preferred embodiment includes leading edge slats 205 that extend conventionally. The slats increase the $C_L$ before stall, and can optionally be deployed autonomously by relative wind directions and/or pressures. The deployment of some slat variations can produce slight pitching moment change. While this effect is not relevant for ordinary aircraft, it is important in the present embodiment in preventing significant pitch-down wing torsion, such as caused by the use of highly cambered airfoils (or flaps, as shown in FIG. 6). Furthermore, the slats let the airfoil of the invention achieve a higher $C_L$ in slower flight, and can retract at higher speeds to cut drag and limit gust loads.

The use of a slat 205, preferably extending autonomously in high $C_L$ flight regimes and retracting in low $C_L$ flight regimes, can increase the max $C_L$ as much as 0.4 or even more, while having either a negligible or even a preferable effect on the pitching moment. With careful design and execution, the drag at both lower and higher speeds can be minimized, as demonstrated by airliners incorporating slat technology.

Additionally, in this variation the wing's airfoil 201 incorporates a reflexed portion 207 at its trailing edge, and is preferably configured to produce a net zero or slightly positive pitching moment even though the wing has high camber. In effect this simulates a standard downward-loaded tail, with a very short moment arm, in the airfoil itself. Such airfoils can achieve a high maximum $C_L$ for lower speeds, with reasonably low drag at higher speeds, while avoiding the wing torsion problems caused by flaps.

Other Embodiments in General

Preferred embodiments of the invention have a variety of potential uses, the primary one being to carry a radio relay station that facilitates communications between ground, air, and/or satellite entities. For radio relay purposes, such embodiments must support an antenna platform that is horizontally (and azimuthally) stabilized and can "see" out in all directions 25° below the horizontal without a wing or tail obstructing the view. Optionally, the antenna platform can be lowered for use during flight and raised to avoid contacting the ground during landings, takeoffs and taxiing.

A common role for embodiments of the aircraft will be to substitute for solar-powered aircraft, such as the one disclosed in U.S. Pat. No. 5,810,284 (the '284 patent), that cannot stationkeep for part or all of the year in some locations due to strong winds and/or limited solar radiation, such as is associated with long nights and low angles of available sunlight during the winter at high latitudes.

The preferred aircraft is unmanned, and can stationkeep closely within a limited boundary. Being unmanned, the aircraft is preferably controlled either by an autonomous system or by remote piloting.

In order to stationkeep closely, the aircraft will be slow flying when winds are light and it will generally maneuver continuously. The aircraft also will fly sufficiently fast enough to stationkeep in strong winds, and to fly significant distances to landing fields having benign weather conditions. It also will have enough climbing ability at peak altitudes when fully loaded (i.e., at the early, fully fueled stage of the flight) to maintain its altitude in atmospheric down-currents.

The preferred aircraft will ordinarily stationkeep in the vicinity of an altitude between 55,000-70,000 feet. The available speed range will range from a stall speed at less than 20 mph IAS (indicated airspeed) to more than 40 mph IAS, which is about 70-140 mph TAS (true airspeed) at 65,000 feet.

Other Embodiments in General

Fuel and Power Systems

Preferred embodiments of the invention are fueled by liquid hydrogen reacted with atmospheric oxygen in a fuel cell. This fuel provides a high energy content. Thus, these embodiments preferably can operate even in zero sun conditions. Other embodiments, including variations of those described above and below, can be configured to use other fuels, and preferably to use gaseous fuels that are stored in liquid form.

Optionally, embodiments of the aircraft can include solar cells to prolong its flight in conditions having extensive available solar radiation. Furthermore, other hybrid combinations of power sources can be used, including ones using regenerative fuel cells and/or conventionally combusted fuels (e.g., turbines or reciprocating engines) and they are within the scope of the invention. A conventionally combusted fuel would preferably draw oxygen for combustion from the surrounding air (usually with some compression).

The mechanical power generated by the power sources can directly drive either a propeller or an attached generator that provides electricity for propeller-driving electric motors. A generator may well be needed for communication, control, and payload operation. A multiple-motor control logic unit can mix power from multiple power sources as each situation requires. Additionally, embodiments will preferably have a small battery energy system to provide redundant power for vehicle communication and control. This battery power can also be used to make landing maneuvers safer.

Other Embodiments in General

Configuration

In part, the invention pertains to the overall vehicle geometry. The configuration of each embodiment is subject to numerous tradeoff considerations. The low-speed flight capability is preferably accommodated through the use of low aircraft weight, large wing area and high maximum lift coefficients of the wing airfoil. The power required at lower speeds is minimized by using a large wingspan that reduces induced drag. High-speed flight is preferably accommodated through the use of higher power generation rates, lower lift coefficients of the wing airfoil, smaller wing area, an extremely clean design and exterior structure, as well as appropriately designed propeller(s). The shifting of the aircraft's CG (center of gravity) and the varying of the aircraft's rotational inertia as the fuel is consumed can be limited by appropriate fuel tank management.

Through the use of larger airfoil chords for a given span, larger wing areas and reduced stall speeds can be achieved. There is also a slightly decreased power requirement, although the added weight of a "fat" wing may negate these benefits. Nevertheless, for the preferred role of embodiments of the present invention, a slower flight speed, even at the cost of extra power, can decrease the extent of the maneuvering necessary to stationkeep during low wind speeds, and thereby increase efficiency. Depending on the operational requirements, a normal optimization study can determine the most useful chord compromise for a final design.

To accommodate these conflicting design criteria, and thereby provide for a large speed range in preferred embodiments, the aircraft is preferably characterized by a geometry change between the low-speed and high-speed flight regimes. The extent of the speed range will vary depending on the stationkeeping requirements. Less-stringent stationkeeping requirements (both laterally and vertically) can permit the aircraft to operate with more efficient, gentle turns and to move to different altitudes if the wind profile showed a benefit in doing so, thus requiring less of a speed range than tighter stationkeeping requirements.

Typically, a conventional vehicle is given pitch and yaw stability primarily by a large tail moment (the tail forces times the moment arm between the wing and the tail) and/or by a canard in front of the wing that, for pitch stability, operates at a higher lift coefficient than the wing and stalls earlier. Tails mounted where they are in the up-flow of wing tip vortices can be much smaller than normal tails positioned in the wing downwash, but there are structural difficulties with such "outboard tails."

As a fuel load is consumed, the aircraft's CG (center of gravity) and rotational inertia will vary. This effect can be limited by appropriate fuel tank management.

Other Embodiments in General

Airframe Components

In part, the invention pertains to the specific design of aircraft's airfoils. A torsionally flexible wing is characteristic of many embodiments of the present invention. The typical airfoil of the invention has enough camber to permit it to achieve a lift coefficient of about 1.5 at the Reynolds number typically experienced by the aircraft. As noted above, there preferably is some geometry change of the aircraft between the low-speed and high-speed flight regimes. Camber-changing devices are relatively simple and useful devices for changing airfoil geometry.

An important aspect of the use of either flaps or highly cambered airfoils designed for high lift, is that such flaps (when extended downward) and airfoils cause a large negative pitching moment on a wing. This affects both the aircraft's overall stability and the wing's torsional deflection. Such wing twist at the outer portions of the wing, due to a negative pitching moment, can be a severe problem with torsionally flexible, long-span wings such as are common in preferred embodiments of the invention.

Regarding the aircraft's overall stability, this problem can be handled by canard or tandem or tailed aircraft approaches within the scope of the invention. The configuration can produce enough pitch stability to overcome the negative pitch effect of the airfoil. The front surface needs to have less percentage lift increase due to a small upward gust than does the rear surface. This is accomplished by having the front surface operate at a higher $C_L$ than does the rear. Note that the rear surface is operating in the downwash wake of the front surface. For the standard configuration this merely decreases the stabilizing effect of the tail, but the vehicle is still stable. For canard configurations the downwash effect becomes much more troublesome, and dictates much higher $C_L$s for the front surface than for the rear, creating both overall vehicle inefficiencies and stall problems.

The larger problem caused by negative pitching moments is that, for a torsionally flexible wing the wing can twist significantly under the pitching moment. This twisting can even produce net negative lift in the outer wing, which is the cause of the undesirable aileron-reversal effect.

Many embodiments of the present invention incorporate flexible wing design aspects such as those disclosed in the '284 patent. Various of these embodiments use one or more mechanisms to counteract this problem.

As noted in the first preferred embodiment, slats provide a mechanism to counteract negative pitching moments in some embodiments, as well as increasing the $C_L$ (coefficient of lift) by 0.3, or even as much as 0.4 or more before the onset of stall. Likewise, as used in the first preferred embodiment, a reflexed airfoil further counteracts the negative pitching moment in some embodiments. With careful design, one or both of these mechanisms can be used to achieve a high maximum $C_L$ for lower speeds with reasonably low drag at higher speeds. Vortex generators can be used on the rear, underside of slats to induce vortices that may permit still higher maximum $C_L$s.

Other mechanisms are provided in some embodiments to limit the effects of a negative pitching moment, as discussed in more detail in the additional preferred embodiments below. These include "section" tails or canards and swept flying wings.

The slatted, highly cambered and reflexed airfoil can be used in both standard-aircraft type embodiments of the invention, such as the first preferred embodiment, and also in flying wings. If the wing of a flying wing is swept, it causes more pitch damping and stability. This also makes CG changes from fuel withdrawal from elongated-fore-aft tanks more tolerable.

Additional Preferred Embodiments

Both the first preferred embodiment and the additional preferred embodiments below are to be understood as including variations incorporating different combinations of the power system and aircraft component features described in this specification. Individual details such as the number and placement of the motors are not depicted in some of the figures for simplicity.

Second Preferred Aircraft Embodiment

The second preferred embodiment of the invention incorporates various combinations of the above-described features into an aircraft incorporating the structural features of the span-loaded flying wing disclosed and/or depicted in the '284 patent. Of particular note, variations of this embodiment incorporate a fuel cell operating at pressures described above with regard to the first preferred embodiment. Additionally, variations of this embodiment incorporate a fuel cell storage tank configured to contain liquid hydrogen, and a heater to boil the liquid hydrogen at a determined or predetermined boiling rate.

This aircraft is characterized by very flexible wing segments that typically have a very slight positive pitching moment by virtue of the airfoils selected. While variations of the second preferred embodiment can include highly cambered airfoils, flaps, slats and/or reflexed trailing edges, this embodiment has not been found to be a highly efficient platform for using high camber.

Third Preferred Aircraft Embodiment

Figure 7A:
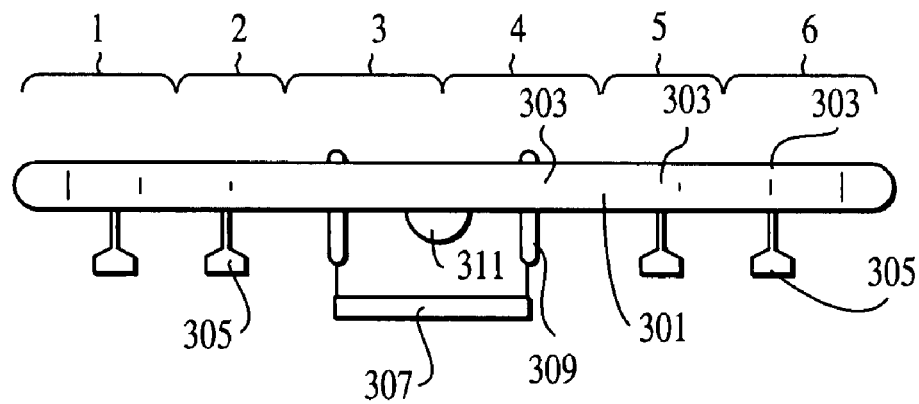
FIG. 7A is a top plan view of a third embodiment of an aircraft embodying features of the present invention.
Figure 7B:
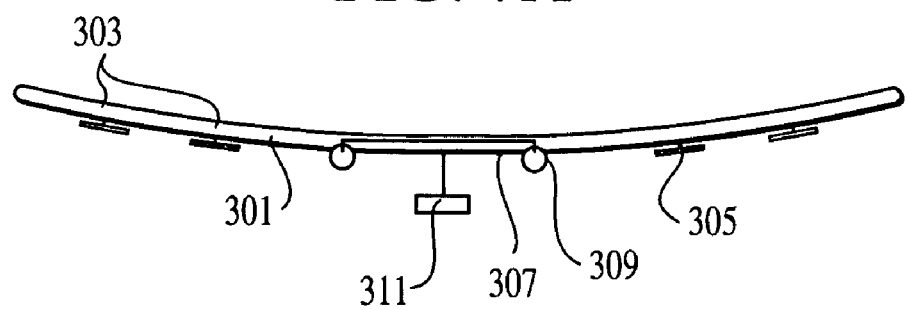
FIG. 7B is a rear elevational view of the embodiment depicted in FIG. 7A.

With reference to FIGS. 7A and 7B, in this embodiment a wing 301 is divided into a number of subsections 303, six being shown in the figure. Each subsection has a tail that permits the negative pitching moments of that section's highly cambered airfoil (or flap) to be reacted. The four outboard sections preferably have separate tails 305, and the two inboard sections share a laterally extending tail 307. Optionally, the sectional structure of this preferred embodiment can adopt many of the features and characteristics of the previous preferred embodiment and/or the aircraft disclosed in the '284 patent.

In this multi-tail assembly, each of two symmetrically located "bodies" or fins 309 holds a liquid hydrogen storage and fuel cell system. Two systems are preferably used for both symmetry and reliability. The two fins support the shared laterally extending tail 307. The two fins also support landing gear, and a communications platform 311, which extends downward for better unobstructed viewing, can be retracted upward for landing.

It should be noted that, as this embodiment rolls in flight, the outboard subsections will tend to orient relative to the local flow regime and thus decrease the roll damping. Active control of the tails on the end subsection units can be used to eliminate the problem. However, the use of active control systems does increase the complexity of the system and thereby reduce its reliability.

The aircraft preferably has enough tails distributed across the wing 301 to handle the pitching moment for each of the wing's subsections 303, providing for both vehicle pitch stability and limited wing twist. If this embodiment's wing is designed torsionally stiff enough to keep the wing from significantly twisting under section pitching moment influences, then some or all of the four outer, separate tails 305 can be removed and the central, laterally extending tail 307 can provide vehicle pitch stability, even with flap deployment.

Fourth Preferred Aircraft Embodiment

Figure 8:
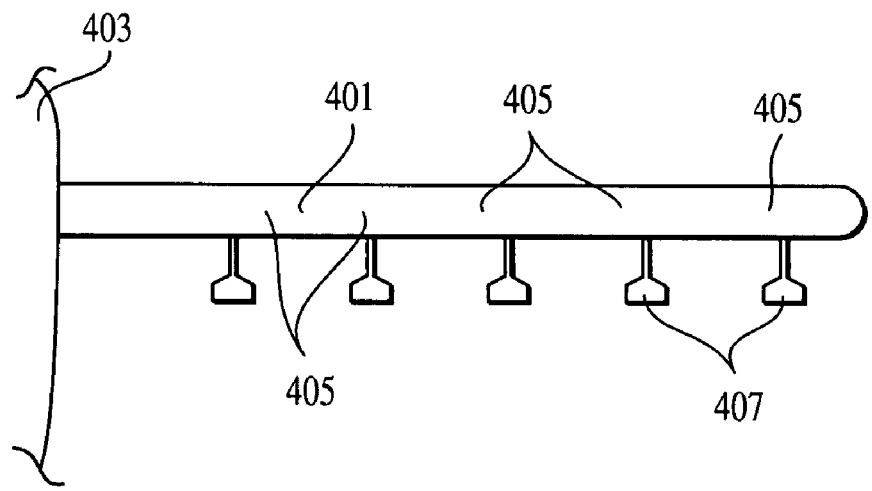
FIG. 8 is a top plan view of a fourth embodiment of an aircraft embodying features of the present invention.

With reference to FIG. 8, in this embodiment a conventional aircraft layout is provided with a flexible wing 401, which supports a fuselage 403 and is divided into a number of subsections 405. Similar to the third preferred embodiment, each subsection has a wing-tail 407 that permits the negative pitching moments of that section's highly cambered airfoil (or flap) to be reacted. The main concern of the wing-tails is to prevent local wing torsion, as the overall aircraft pitching moments can be reacted by a tail (not shown) mounted on the fuselage.

Because the wing is flexible, the roll damping is decreased as the wing twists during roll. This effect can be decreased if the sections rotate on a strong spar, and both tip sections are rigidly attached to the torsionally stiff spar to provide roll damping. The wing could be swept in variations of this embodiment.

Fifth Preferred Aircraft Embodiment

Figure 9:
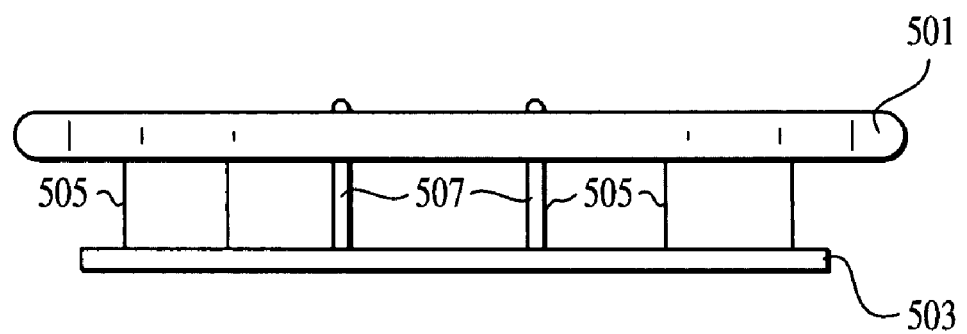
FIG. 9 is a top plan view of a fifth embodiment of an aircraft embodying features of the present invention.

With reference to FIG. 9, in this embodiment a long and typically flexible wing 501, such as might be found in the third preferred embodiment, is connected to a laterally extending tail 503 by a plurality of small "fuselages," 505 some of which could simply be spars. The tail extends laterally across substantially the entire wing. Two primary fuselages 507 preferably include fuel and power modules. The aircraft thus has pitch stability all across the span, even with the use of flaps on the wing.

The torsional flexibility of the wing and tail sections of this embodiment will need to be made adequately rigid enough to limit deflection during roll unless active control is to be used. As noted above, it is preferable to avoid active control if possible.

As previously noted for all embodiments, this embodiment can include variations having different combinations of slats and flaps (e.g., slotted flaps). These include variations characterized by the tail having a small chord and zero lift at intermediate speeds.

Sixth Preferred Aircraft Embodiment

Figure 10A:
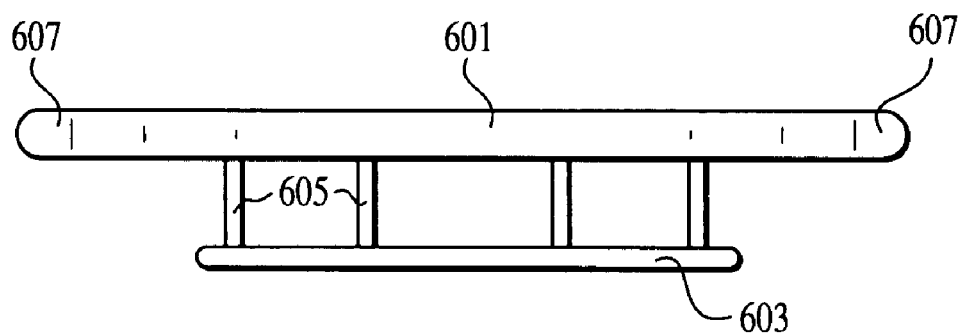
FIG. 10A is a top plan view of a sixth embodiment of an aircraft embodying features of the present invention.
Figure 10B:
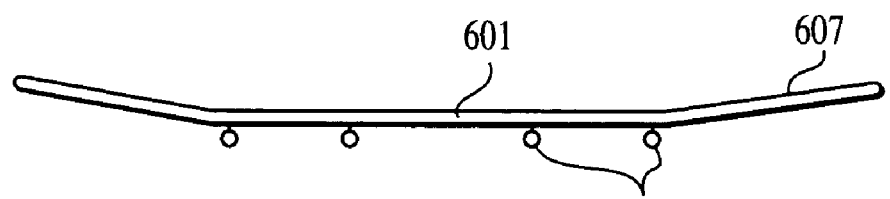
FIG. 10B is a rear, elevational view of the embodiment depicted in FIG. 10A.

With reference to FIGS. 10A and 10B, in this embodiment a long and typically flexible wing 601, such as might be found in the third preferred embodiment, is connected to a laterally extending tail 603 by a plurality (namely four) of "fuselages," 605, each being a fuel/power module that also provides an adequate moment arm to support the tail. Each outboard end 607 of the wing extends roughly 25 feet beyond the outermost fuselage and is made torsionally strong enough such that flap/aileron deflection is limited to about half of that used in the inner, span-loaded 90 feet of the wing. This construction provides that aileron reversal will only occur at speeds significantly higher than preferred indicated airspeeds.

Additionally, the four fuselages 605 provide mountings for simple landing gear (e.g., two tiny retractable wheels on each fuselage). A radio relay pod can be lowered during flight to a level where 30° banks of the aircraft will not obstruct the pod's visibility at more than 20° below the horizon.

Variations of the Third through Sixth Embodiments

Another approach within the scope of the invention is to vary the above-described third through sixth embodiments to have canards rather than tails. It should be noted that a lower $C_L$ is required on the rear wing surface (i.e., it has an early stalling front surface). This will likely cause higher levels of drag than the described variations with tails.

Seventh Preferred Aircraft Embodiment

Figure 11A:
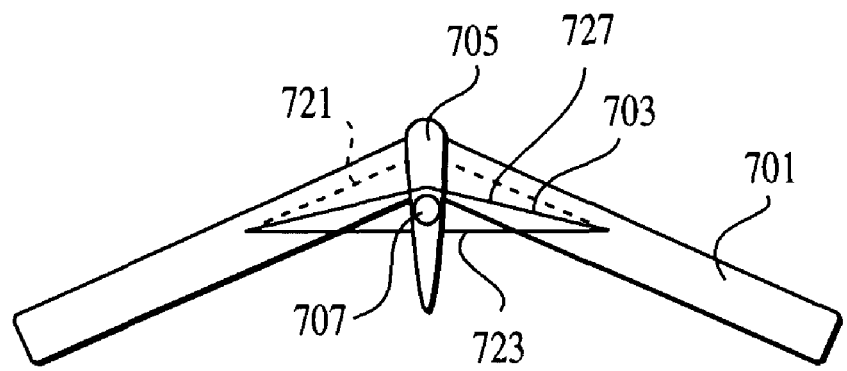
FIG. 11A is a bottom plan view of a seventh embodiment of an aircraft embodying features of the present invention.
Figure 11B:
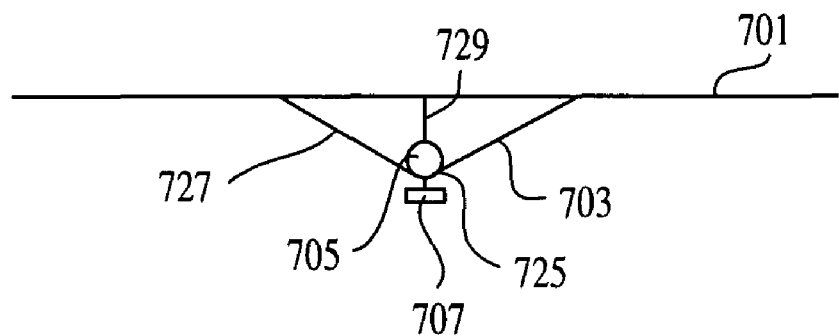
FIG. 11B is a front, elevational view of the embodiment depicted in FIG. 11A.

With reference to FIGS. 11A and 11B, a seventh, preferred embodiment is a swept flying wing design having a wing 701 and a 6-element tetrahedron frame 703 formed of compression struts. A fuel and power module 705 and a radio platform 707 are centrally located and preferably supported by the tetrahedron frame. The tetrahedron frame adds great strength to the inner portions of the wing, permitting the weight of fuel and power module and the radio platform to be handled readily. Stabilizers and/or control surfaces can optionally be mounted on the fuel and power module to add further stability and/or control.

Three elements of the tetrahedron frame 703 are preferably in a plane defined by the wing's main spars, extending along both sides of the wing 701. Two wing-based elements 721 of these three spar-plane elements either extend from a common, structurally reenforced point at the nose, along the spars, or are composed of the spars themselves. The third of the three spar-plane elements is a laterally extending element 723 that extends between the spars from spar locations roughly 50 or 60 feet apart. There can be a benefit in integrating the lateral element of the tetrahedron into an extended wing chord in the middle portion of the aircraft (not shown). If this embodiment's span is 140 feet (having an aspect ratio approximately in the range of 14-17.5), the cantilevered wing elements outboard of the tetrahedron will laterally extend 40 or 45 feet each, being a somewhat longer distance when considering the sweep, but still a relatively short distance that is consistent with good torsional and bending strength.

The remaining three elements of the tetrahedron frame 703 extend downward to a common point 725. Two side-descending elements 727 of these three downward-extending elements extend down from the two ends of the laterally extending element 723, while the third, a center-descending element 729, of these three downward-extending elements extends down from the common, structurally stiff or reenforced part of the spars at the nose of the aircraft, where the two wing-based elements 721 meet.

The drag of externally exposed compression struts is of aerodynamic relevance, and these should be design aerodynamically. Omitting the portions of the compression struts that are within the wing, the remaining, exposed elements represent roughly 100 feet or less of exposed strut length. With 1 foot chord, and a low drag shape giving a $Cd_o$ of approximately 0.01, only 1 ft² of equivalent flat plate area is added to the plane by the exposed elements.

In the relatively simple configuration of this embodiment, pitch and yaw control can be achieved by tip elevons, or more preferably, by wingtips that rotate about an axis along the wing's quarter chord. This rotating-tip type of control has been successfully implemented in flying wings and conventional aircraft.

A benefit of many variations of the swept flying wing is that, by appropriate wing twist (and hence lift distribution) the tips can be in a region featuring upwash, letting the tips produce thrust and permitting banked turns without causing adverse yaw. This is accomplished without the drag of a vertical surface.

Figure 11C:
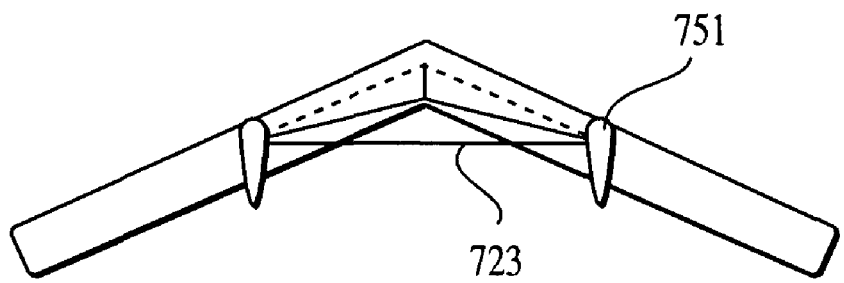
FIG. 11C is a bottom plan view of a variation of the embodiment depicted in FIG. 11A.

Furthermore, many variations of this embodiment will have strong pitch stability, thus providing the ability to accommodate a reasonable negative pitching moment, such as from positive flaps that increase camber. If these portions are forward of the CG, the configuration pitch stability is more readily able to accommodate the effects of airfoil pitch instability. Preferably this embodiment of the aircraft includes a cambered airfoil with reflex and slats, taking full advantage of the strong tetrahedron structure for distributing loads. Thus, the combination of the cambered/reflexed/slatted airfoil, used on the flying wing of the present embodiment, is especially preferred With reference to FIG. 11C, in a variation of the seventh, preferred embodiment, two power pods 751 are located far out at the ends of the laterally extending tetrahedron element 723, making the aircraft into a span-loaded, swept flying wing.

A Further Variation of the Embodiments

The above described embodiments can each be varied so as to be directed to a multi-wing aircraft such as a biplane, such as with each wing having half the chord of the equivalent monoplane wing. The vehicle performance would remain about the same but the wing's negative pitching moment effect would be reduced because the chord would be halved. The big box truss has merit for achieving torsional and bending rigidity and perhaps for lower wing weight. Nevertheless, there is a drag penalty due to the struts and wires and their intersections with the wing.

If a 100-foot span wing with an 8' chord and thus a 12.5 aspect ratio (800 ft², at a high-speed $C_L$ of 0.3 having a parasite drag coefficient of 0.007 and hence a drag area of 5.6 ft²) were equated to a biplane with two 4-foot chord wings, having 600 ft of 1/16" piano wire to stabilize the box formed by the two wings, the wire drag area would be more than 3 ft². Considering strut drag, and the fact that the lower Reynolds number for the airfoils adds to their drag, the wing drag area would more than double and inhibit high-speed flight for that embodiment.

From the foregoing description, it will be appreciated that the present invention provides a number of embodiments of a lightweight aircraft capable of both stationkeeping and flight over a wide range of speeds, while consuming low levels of power, for an extended period of time, while supporting an unobstructed communications platform, and while exhibiting simplicity and reliability While a particular form of the invention has been illustrated and described, it will be apparent that additional variations and modifications can be made without departing from the spirit and scope of the invention. Thus, although the invention has been described in detail with reference only to the preferred embodiments, those having ordinary skill in the art will appreciate that various modifications can be made without departing from the invention. Accordingly, the invention is not intended to be limited, and is defined with reference to the following claims.

We claim:

1. An aircraft, comprising:
    a hydrogen source;
    an oxygen source;
    one or more aircraft engines configured to provide all necessary thrust for the aircraft to fly; and
    a fuel cell configured to react hydrogen from the hydrogen source with oxygen from the oxygen source to generate power, wherein the fuel cell is configured to react the hydrogen with the oxygen, each being supplied at reaction pressures of less than one atmosphere absolute;
    wherein power generated by the fuel cell powers the one or more aircraft engines; and
    wherein the fuel cell is further configured to provide sufficient power for the one or more aircraft engines to enable the aircraft to loiter at altitude with the hydrogen and the oxygen being supplied for reaction in the fuel cell at reaction pressures of less than one atmosphere absolute;
    wherein the fuel cell is configured to react the hydrogen with the oxygen at pressures of approximately 2-3 psia;
    and further comprising a control system configured to actively control and vary the pressures at which the hydrogen and oxygen are supplied for reaction in the fuel cell;
    wherein the control system is configured to actively control the reaction pressures of the fuel cell based on the altitude of the aircraft.

2. The aircraft of claim 1, wherein the aircraft is configured for continuous operation in conditions equivalent to an altitude of 55,000-70,000 feet.

3. The aircraft of claim 1, and further comprising solar cells configured to provide power to the aircraft when the sun illuminates the solar cells.

4. The aircraft of claim 1, wherein the control system is configured to actively control and vary the reaction pressures of the fuel cell based on the power requirements of the aircraft.

5. The aircraft of claim 1, wherein the control system is configured to actively control and vary the reaction pressures of the fuel cell such that fuel is reacted at the minimum rate necessary to meet a power-generation requirement.

6. The aircraft of claim 5, wherein the control system is configured to actively control and vary both the rate at which fuel is supplied and the pressure at which oxidizer is supplied.

* * * * *